United States Patent Office 3,563,848
Patented Feb. 16, 1971

3,563,848
METAL COMPLEX MODIFIED POLYESTER REINFORCING ELEMENTS AND RUBBER STRUCTURES MADE THEREFROM
Roop S. Bhakuni and Joseph L. Cormany, Jr., Akron, Ohio, assignors to The Goodyear Tire & Rubber Company, Akron, Ohio, a corporation of Ohio
No Drawing. Filed June 14, 1968, Ser. No. 736,973
Int. Cl. C08d *11/04;* C08f *45/62;* C08g *39/10;*
D02g *3/48*
U.S. Cl. 161—176   21 Claims

ABSTRACT OF THE DISCLOSURE

Relates to an improved rubber structure reinforced with an improved polyester reinforcing fiber modified with either a metal complex alone or in combination with a polycarbonate alone or in combination with an isocyanate, the modifier being present in the polyester prior to fiber formation.

---

This invention relates to an improved rubber structure reinforced with an improved polyester reinforcing fiber modified with a metal complex compound present in the polyester prior to fiber formation.

Pneumatic tires are being subjected to increasingly severe operating conditions including high speeds and heavy loads. Rubber used in the tire is reinforced with such materials as rayon, nylon, polyester, wire, and glass fibers. Maximum reinforcement of the rubber is obtained with a given fiber when maximum adhesion is produced between the rubber and fiber. Polyethylene terephthalate tire cords are particularly desirable to use as reinforcing elements because of their excellent dimensional stability as shown by low growth or stretch during service. However, it has been observed that in the environment of the rubber of a pneumatic tire the heat generated under high speeds and heavy loads causes the polyester cord to lose tensile strength and ultimately adhesion to the rubber.

The chemical environment of the rubber of a tire is complex because many different chemicals are needed in its construction in order to obtain maximum tire performance. Because of this chemical complexity in the rubber and the severe heat developed during service, a variety of chemical reactions result in the degradation of the polyester cord and the adhesive bond between the cord and the rubber.

Many attempts have been made to minimize these destructive forces and the present invention is an advance in solving the problems created by these destructive forces. Prior attempts have been made by modifying the rubber. Other attempts have been directed toward the adhesive. The present invention is directed toward the polyester cord.

It has now been discovered that a more thermally stable pneumatic tire may be made when the rubber thereof is reinforced with a modified polyester cord described herein.

The thermally stable tire is made possible by the discovery that a polyester cord used in the construction of the pneumatic tire can be protected against tensile loss in the cord and degradation of the adhesive bond between the cord and the rubber by incorporating in the polyester prior to fiber formation a critically small amount of a modifier which is (1) physically and chemically compatible with the polyester, (2) reactive with the polyester within the limitations of time and temperature existing in an extruder used in melt spinning, generally less than 10 minutes and preferably 1 to 4 minutes and between 10 to 60° C. above the melting point of the polyester at normal pressures, (3) of the proper melt viscosity to prevent dripping of the spun resin which may occur when the melt viscosity is too low and to prevent excessive pack pressure during extrusion which may occur if the melt viscosity is too high, (4) of such nature that it degradation products will not be harmful to the polyester; otherwise a drop in tensile will occur, (5) of such a nature as to impart or not interfere with good spinning and drawing of the polyester, control of which may be achieved by controlling the reaction during extrusion; otherwise if no control is possible then excessive crosslinking may occur and the resin will be difficult to properly draw, and (6) of a high melting point and a low vapor pressure thereby imparting efficiency in the processing of the material being drawn.

Such a modifier has been discovered to be a metal complex used alone or in combination with a polycarbonate alone or in combination with an isocyanate alone or in combination with both a polycarbonate and an isocyanate.

It has been observed that an exceptional increase in hot adhesion is obtained when a small amount of a polycarbonate alone or together with a small amount of an isocyanate is added with the metal complex to the polyester chips prior to fiber formation.

It is believed that certain desirable reactions take place between the metal complex and certain undesirable by-products present in the polyester to form a reaction product which is less detrimental to the polyester at elevated temperatures than are the by-products.

The metal complex compound used in the present invention is any complex the metal ion of which has an incompletely satisfied $d$ orbital and will further complex or coordinate with compounds containing atoms like N, O, P, S and halogens and has stability (log $k$) constant for its ammonia and amine complexes of between 5 and 25. The metal ions preferred in the metal complex of this invention include Ti, V, Cr, Mn, Fe, Co, Ni, Cu, Zr, Nb, Mo, Tc, Ru, Rh, Pd, Ag, Hf, Ta, W, Re, Os, Tr, Pt, Au, Th, and Pa. A preferred metal complex is copper dimethyldithiocarbamate having the general formula

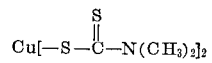

The metal complex may be used alone or in combination with other modifying agents of the nature shown in amounts from about .001 part to .1 part per 100 parts of polyester. Polycarbonate, when added with the complex, may be present in an amount of between about .5 part to 2.5 parts per 100 parts of polyester. The isocyanate which also includes the isocyanate generating compounds when added to the complex alone or in combination with the polycarbonate may be present in an amount from about .01 part to 1.5 parts per 100 parts of polyester.

Typical isocyanates that may be used are:

Polymethylene polyphenylisocyanate (sometimes referred by the trademark "PAPI")
Triphenyl methane-triisocyanate
2,4-tolylene-diisocyanate and dimer (sometimes referred to by the trademark "Desmodur TT" preparation for which see British 1,088,580)
2,6-tolylene-diisocyanate
Bitolylene diisocyanate
Dianisidine diisocyanate
m-Phenylene diisocyanate
1-alkyl-benzene-2,4-diisocyanate
1-alkyl-benzene-2,5-diisocyanate
2,6-dialkyl-benzene-1,4-diisocyanate
1-chlorobenzene-2,4-diisocyanate
Dicyclohexylmethane-diisocyanate 3,3-dimethoxy diphenyl methane-4,4'-diisocyanate
1-nitrobenzene-2,4-diisocyanate
1-alkoxy-benzene-2,4-diisocyanate
1-alkylbenzene-2,6-diisocyanate
m-Xylylene-diisocyanate
1,3-dimethyl-4,6-bis (β-isocyanatoethyl) benzene-diisocyanate
Hexahydrobenzidine-4,4'-diisocyanate
Ethylene-diisocyanate
Propylene-1,2-diisocyanate
Cyclohexylene-1,2-diisocyanate
3,3'-dichloro-4,4'-biphenylene diisocyanate
2,3-dimethyl-tetramethylene diisocyanate
Cyclohexyl isocyanate
p,p'-Diphenylene diisocyanate
2-chlorotrimethylene diisocyanate
Butane-1,2,2-triisocyanate
Trimethylene diisocyanate
Tetramethylene diisocyanate
Propylene-1,2-diisocyanate
Butylene-1,2-diisocyanate
Ethylidene diisocyanate
Phenyl isocyanate.

Polymethylene polyphenylisocyanate identified above by the trademark "PAPI" is also referred to as polyaryl polyisocyanate and being a dark amber somewhat viscous liquid belonging to the aromatic polyisocyanate family as disclosed in a new product bulletin issued by The Carwin Company of North Haven, Conn., dated July 1956. "PAPI" is further described as containing both ortho and para substitution and composed of a family of low molecular weight polymers having an average composition of the trimer with $n$ in the formula above having an average value of 1 and manufactured under U.S. Pat. 2,683,730, the formula being shown therein.

Typical isocyanate generating compounds are blocked isocyanates which include all reaction products of an isocyanate and a compound having a hydrogen reactive with the isocyanate group. Examples of the blocking compounds include monohydroxy compounds especially primary and secondary alcohols, details of preparation being disclosed in U.S. Pats. 2,952,665 and 3,325,333, amines including urea, primary and secondary mono and polyhydric phenols including phenol and resorcinol (when phenol is used to block "PAPI," the resulting compound is known by the trademark "Hylene MP" as more fully described in "Adhesives Age," 2, 30–33 (1959)) amides, as well as lactams, details of preparation being disclosed in Belgian Pat. 665,474, when caprolactam is used to block "PAPI" the resulting compound is known by the trademark "Isonate" 123P, and resinous compositions which have an active hydrogen and will block an isocyanate. The preferred type of resinous blocking agent is made by reacting an aldehyde with a resin-forming component such as urea, or a phenol, preferably a polyhydric phenol, such as resorcinol. Suitable aldehydes that may be used in forming a resin include formaldehyde, acrolein, glyoxal, furfural, crotonaldehyde, aldol and benzylaldehyde. Suitable phenols that may be reacted with one of the aforementioned aldehydes include phenol, cresol, catechol, phloroglucinol, saligenin, dibeta naphthol, xylenol, hydroquinone, resorcinol, orcinol, pyrogallol, beta-naphthol, amino-phenol, guaiacol, as well as urea and melamine. More detail of preparation is disclosed in U.S. Pat. 3,268,467.

When the hydroxy compound is reacted with the isocyanate to form a blocked isocyanate, the isocyanate group is converted to a urethane group and the following general formula may be used to express this conversion: ROH+R'NCO→ROCONHR'. With a polyisocyanate the reaction may be expressed in terms of the following general formula: ROH+OCNR'NCO→ROCONHR'NCO wherein R and R' represent mono and divalent organic radicals. Suitable hydroxy compounds include aliphatic, araliphatic and hydroaromatic alcohols such as methanol, ethanol, butanol, isobutanol, octyl alcohol, cyclohexanol, benzyl alcohol, xylenols, cresols, resorcinol and phenol and mixtures thereof.

When a lactam is reacted with an isocyanate to form a lactam blocked isocyanate the isocyanate group is converted to a urethane group. The following general formula may be used to express this conversion:

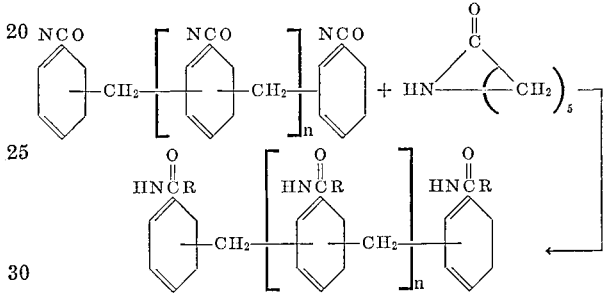

wherein R and R' are any organic radical up to 8 carbons. A more specific embodiment of a lactam blocked isocyanate is one involving the following reaction:

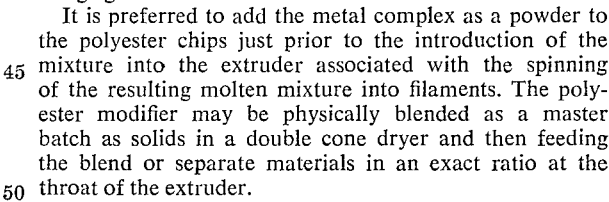

wherein when R is the lactam above and $n$ is 1 the product is sometimes commercially referred to as "Isonate 123P" and described in a bulletin dated Sept. 1, 1966, published by The Upjohn Company Polymer Chemicals Division.

The amide blocked isocyanates are made in a manner similar to the manner described above for the amines and the ureas.

The term "isocyanate" includes both an isocyanate or polyisocyanate per se as well as an isocyanate generating agent.

It is preferred to add the metal complex as a powder to the polyester chips just prior to the introduction of the mixture into the extruder associated with the spinning of the resulting molten mixture into filaments. The polyester modifier may be physically blended as a master batch as solids in a double cone dryer and then feeding the blend or separate materials in an exact ratio at the throat of the extruder.

The improvements of this invention are observed when less than about .1 part by weight of the metal complex is added to 100 parts of polyester and in more than about .001 part. It is essential that when the metal complex is to be intimately blended with the polyester in the molten state which occurs in the range from about 270° C. to about 310° C. that the molten blend be maintained under a pressure of about 800 lbs. per square inch for not more than 10 minutes and preferably for from 1 to 4 minutes and out of contct with oxygen, a condition present in melt spinning apparatus.

The improved fiber to be used in this invention is made as indicated above by adding the metal complex to a polyester prior to fiber formation. The polyester is any fiber forming thermoplastic linear high molecular weight condensation polyester, and particularly polyethylene terephthalate as well as polymers of cyclohexanedimethylene terephthalate. These polyesters as well as copolyesters of aromatic dicarboxylic acids and particularly condensation products of ethylene glycol with a mixture of terephthalic acid and isophthalic acid, ethylene glycol with terephthalic acid and another dibasic acid such as sebasic or adipic acid or hydroxycarboxylic acid such as parahydroxy benzoic acid present in small amounts and polyesters of terephthalic acid with the glycol 1,4 bis(hydroxymethyl) cyclohexane. By linear terephthalic polyesters is meant a linear condensation polyester comprising recurring glycol dicarboxylic structural units in which at least about 85% of the recurring structural units are units of the formula

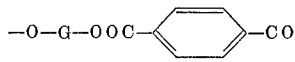

wherein G represents a divalent organic radical containing from about 2 to about 8 carbon atoms which is attached to the adjacent oxygen atoms by saturated carbon atoms. The terephthalate radical may be the sole dicarboxylate constituent of the recurring structural units or up to about 15% of the structural units may contain other dicarboxylate radicals such as adipate, sebacate, isophthalate, 4,4' bibenzoate and hexahydroterephthalate. By high molecular weight is meant polyesters having an intrinsic viscosity of at least 0.4 and preferably greater than 0.6 and as high at 1.5 as measured in a 60/40 phenol/tetrachlorethane mixed solvent at 30° C. It is preferred that the polyethylene terephthalate and other similar polyesters have a high melting point which for polyethylene terephthalate is about 265° C. measured with a hot stage polarizing microscope. Generally the polyester fibers of this invention may be prepared in accordance with well-known procedures for melt extrusion and drafting.

The rubber component of the rubber structure of this invention may be any rubber that is a stretchable composition having a tendency to return to its approximate original shape after being vulcanized, and particularly any rubber that is used in the manufacture of tires and drive belts. Thus, the laminate of this invention may involve natural rubber otherwise known as *Hevea brasiliensis*, or conjugated diene polymeric rubbers made by polymerizing butadiene-1,3, isoprene, 2,3-dimethyl butadiene-1,3- and mixtures of these conjugated dienes as well as copolymers of these diene monomers with up to 50% of compounds which contain a $CH_2=C=$ group and which are copolymerizable with butadiene-1,3 where, for example, at least one of the valences is attached to an electronegative radical, that is a radical which increases the polar character of the molecule such as vinyl, phenyl, nitrile and carboxy radicals. Examples of the diene rubbers are polybutadienes including the stereospecifics, polyisoprenes including the stereospecifics, butadiene/styrene copolymers, also known as SBR, and butadiene/acrylonitrile copolymers also known as NBR.

The following example discloses how an improved polyester cord may be made by adding a metal complex to polyester chips and then forming filaments therefrom.

EXAMPLE 1 (CMPE)

100 parts of dried polyethylene terephthalate (PE) chips are tumbled with .025 part of copper dimethyldithiocarbamate (C) until the mixture is substantially homogeneous. The resulting blend of the copper dimethyldithiocarbamate and polyester is melt spun at a temperature of 290° C. through a 190 hole spinneret at a spinning speed of 150 yards per minute to give a single spun yarn having a total denier of approximately 7800. The spun yarn is passed to a pair of rotating heated feed rolls and then passed around a pair of heated draw rolls rotating at a speed to impart a draw ratio of about 6 to 1 to give a total denier of approximately 1300 and then wound on a bobbin. The modified polyester yarn has a tenacity of 7.9 grams per denier, a break elongation of 13%, an intrinsic viscosity of .785, a tensile strength of 24.3 lbs., and an elongation at 10 lbs. pull of 6.2%.

The yarn produced above is plied 8 turns per inch, 3 of these plies are twisted in reverse direction 8 turns per inch to form the cord used in producing the improved rubber structure of this invention. The resulting cord has a break strength of 62.8 lbs., a 5% modulus (lase) of 12.6, a 10% modulus (lase) of 26.1, and an elongation at break of 19.7%. The resulting modified polyester cord is identified as cord sample A. The unmodified polyester was processed into filaments and a cord made in the exact manner described above and identified as cord sample B.

Both cord samples A and B were treated with an R/F/L adhesive made in the following manner. A 20% solids dispersion of a conventional R/F/L adhesive is made by adding 8.9 parts of resorcinol to 6.55 parts of a 37% solution of formaldehyde and 5 parts of a 10% solution of sodium hydroxide which is then added to a latex mixture comprising 35.5 parts of a 39.5% total solids of the 70/15/15 terpolymer of butadiene/styrene/vinyl pyridine and 64 parts of a 40.7% total solids of a 70/30 copolymer of butadiene/styrene, the mixture being in 130.05 parts of water. Certain of the cords are passed through a dip tank containing this adhesive. The dipped cords are then dried at 450° F. and embedded in rubber compounded as shown below and then peel adhesion test is made of a one-inch strip under static conditions at 250° F. Thermal stability of the cord is measured in terms of percent tensile retained by the air bomb (AB). Air bomb testing is done by heating the untreated cord embedded in the rubber compound as shown below for 2.5 hours at 350° F. under 80 p.s.i. air pressure. The data obtained is listed in Table 1.

EXAMPLE 2 (CTMPE)

100 parts of dried polyethylene terephthalate (PE) chips are tumbled with .015 part of copper dimethyldithiocarbamate (C) and 1.0 part of a polyester blocked polyisocyanate (T) resulting from the reaction of 100 parts of the hydroxyl polyester from the reaction of 11 mols of ethylene glycol and 10 mols of adipic acid, 9 parts of 1,4-butanediol blocked with 40 parts of 4,4'-diphenylmethane diisocyanate having an HCl acidity of 0.017% and commercially available as "Texin" 192A sold by Mobay, until the mixture is substantially homogeneous. The resulting blend of the carbamate (C) and the polyester blocked polyisocyanate (T) and polyester (CTMPE) is melt spun at a temperature of 290° C. through a 190 hole spinneret under the same conditions described for Example 1. This yarn identified as (CTMPE) is then tested in the same manner as shown in Example 1 and the resulting data reported in Table 1.

EXAMPLE 3 (CTPCMPE)

Example 2 is repeated with the exception that 2 parts of a polycarbonate (PC) of the nature shown below and having an intrinsic viscosity of .5 is added along with the carbamate (C) and the polyester blocked polyisocyanate (T) to the dried polyethylene terephthalate (PE) chips and mixed to form a homogeneous mixture. The resulting blend (CTPCMPE) is then melt spun at a temperature of 290° C. through a 190 hole spinneret under the same conditions described in Example 1. This yarn identified as (CTDMPE) is then tested in the same manner as shown in Example 1 and the resulting data reported in Table 1.

TABLE 1

| Example | | Adhesive 1" strip hot static | Mallory fatigue, KC | Percent tensile retained, AB |
|---|---|---|---|---|
| 1 | Control (PE cord sample B of Ex. 1—1,300/3, 8/8). | 100 | 100 | 100 |
| 2 | CMPE (cord sample A of Ex. 1—1,300/3, 8/8) | 109 | 115 | 115 |
| 3 | CTMPE (Ex. 2 cord—1,300/3, 8/8) | 115 | 139 | 108 |
| 4 | CTPCMPE (Ex. 3 cord—1,000/3, 10/10) | 120 | 143 | 108 |

The polycarbonate as a powder or fine particles is added to the polyester together with the other modifying agent usually in the form of chips or granules and the mixture is then passed to a melting zone as in an extruder and then forwarded by means of gear pumps or the like to a filter pack and a spinneret from which filaments are formed in a continuous manner. A number of these filaments are gathered into a yarn, which yarn is then twisted to form a ply, a number of which plies are then twisted to form a cord.

Any polycarbonate may be used as an additive or modifier or scavenger or protective agent in combination with the other modifier or scavenger or protective agents for polyester tire cord. Broadly, the polycarbonates may be any derived from 4,4'-dihydroxy-di(mononuclear aryl)-alkane and having a molecular weight between about 15,000 and about 80,000 and an intrinsic viscosity between about .46 and about 1.2 as measured by dilute solution viscometry in methylene chloride at 25° C. These polycarbonates can be prepared in accordance with conventional methods including phosgenation in which phosgene is blown into the 4,4'-dihydroxy-di(mononuclear aryl)-alkane in the presence of an aqueous solution of a caustic alkali and a solvent. The ester-interchange method may also be used wherein a 4,4'-dihydroxy-di(mononuclear aryl)-alkane is reacted with a diester of carboxylic acid and as more fully described in British Pat. 772,627.

The polycarbonate used in the present invention was a polyester of carbonic acid and bisphenol A known as [bis-(4-hydroxyphenyl)2,2,propane] and having the repeating unit structure

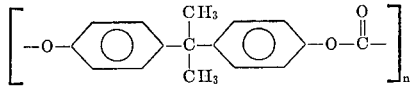

wherein $n$ is a measure of the molecular weight and may be at least 10 and up to 400.

The modified polyester cord is embedded in rubber compounded in accordance with the following formula:

| Ingredients | Parts by weight | |
|---|---|---|
| | Amount used | May be used |
| 1. Natural rubber | 70 | 0–100 |
| 2. OE/SBR 1778 (styrene/butadiene-1,3, 23.5/76.5 copolymer)(plus 37½ parts oil per 100 SBR) | 27.5 | 100–0 |
| 3. Cis 1,4-polybutadiene | 10 | 0–50 |
| 4. Carbon black (reinforcing agent) | 40 | 25–100 |
| 5. Zinc oxide (activator of cure) | 4 | 2–10 |
| 6. Stearic acid (activator of cure) | 2 | 1.5–3.0 |
| 7. Primary accelerator (2,2'-dithiobisbenzothiazole) | 1.25 | .5–3.0 |
| 8. Pine oil (softener) | 10 | 2–50 |
| 9. Secondary accelerator (tetramethylthiuram disulfide) | .10 | .05–1.0 |
| 10. Antioxidant | .60 | .1–4 |
| 11. Sulfur (vulcanizing agent) | 2.5 | 1.0–5.0 |

In compounding the rubber stock in accordance with the formulation set forth above, a master batch of ingredients 1 and 2 are made with the carbon black and mixed on a mill to a temperature of about 110° C. and may be mixed at a temperature as high as 140° C. The resulting carbon black master batch is then cooled and the remaining compounds are mixed into the batch in the order indicated above to a temperature of about 70° C. and may be mixed at a temeprature as high as 100° C.

The rubber structure of this invention may be prepared by first coating a reinforcing fabric with the rubber and then using the rubber coated fabric to make any desired structure as, for example, a pneumatic tire. The rubber will be compounded in the manner set forth above. The reinforcing fabric may be used without any previous treatment, and under these conditions the fabric is known as grey cord indicating that no treatment in the form of an adhesive composition has been applied to the surface of the cord. Thus, the present invention may be used in the manufacture of a pneumatic tire of conventional present day design as shown, for example, in such U.S. Pats. as 3,157,218; 3,160,191; 3,160,192; 3,217,778; 3,225,810; 3,225,812; 3,244,215; 3,253,633 and 3,253,638 all of which show a vulcanized rubberized fabric carcass of generally torodial shape having a tread portion superimposed and bonded to the crown area of the carcass and plies of rubberized fabric forming sidewalls extending from the tread over the carcass to the bead portion.

While certain representative embodiments and details have been shown for the purpose of illustrating the invention, it will be apparent to those skilled in this art that various changes and modifications may be made therein without departing from the spirit or scope of the invention.

What is claimed is:

1. A heat stable structure comprising a heat stable polyester tire cord bonded to rubber, the cord being made of polyethylene terephthalate fibers melt spun from a melt composition resulting from melting a physical mixture consisting essentially of polyethylene terephthalate having an I.V. of at least .6, and from about .001 to .1 part by weight per 100 parts of polyethylene terephthalate of a metal complex, the metal ion of which has an incompletely satisfied $d$ orbital and whose ammonia and amine complexes have a log $k$ stability constant between about 5 and 25 and which complex contains at least one atom selected from the group consisting of O, N, P, S and halogen.

2. The structure of claim 1 wherein the complex has a metal ion selected from the group consisting of Ti, V, Cr, Mn, Fe, Co, Ni, Cu, Zr, Nb, Mo, Tc, Ru, Rh, Pd, Ag, Hf, Ta, W, Re, Os, Ir, Pt, Au, Th, and Pa.

3. The structure of claim 1 wherein the complex is copper dimethyldithiocarbamate.

4. A heat stable structure comprising a heat stable polyester tire cord bonded to rubber the cord being made of polyethylene terephthalate fibers melt spun from a melt composition resulting from melting a physical mixture of polyethylene terephthalate having an I.V. of at least .6 from about .001 to .1 part by weight per 100 parts of polyethylene terephthalate of a metal complex, the metal ion of which has an incompletely satisfied $d$ orbital and whose ammonia and amine complexes have a log $k$ stability constant between about 5 and 25 and which complex contains at least one atom selected from the group consisting of O, N, P, S, and halogen, and between about .5 part to about 2.5 parts per 100 parts of polyethylene terephthalate of a polycarbonate derived from a 4,4' dihydroxy di(mono nuclear aryl)alkane.

5. The structure of claim 4 wherein the polycarbonate is the reaction product of carbonic acid and bis phenol A and has the repeating unit

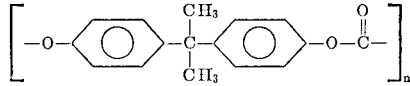

wherein $n$ has a value from about 10 to 400.

6. The structure of claim 5 wherein the complex is copper dimethyldithiocarbamate.

7. A heat stable structure comprising a heat stable polyester tire cord bonded to rubber, the cord being made of polyethylene terephthalate fibers melt spun from a melt composition resulting from melting a physical mixture of polyethylene terephthalate having an I.V. of at least .6, from about .001 to .1 part by weight per 100 parts of polyethylene terephthalate of a metal complex, the metal ion of which has an incompletely satisfied $d$ orbital and whose ammonia and amine complexes have a log $k$ stability constant between about 5 and 25 and which complex contains at least one atom selected from the group consisting of O, N, P, S and halogen, and from about .01 part to about 1.5 parts per 100 parts of polyethylene terephthalate of an organic polyisocyanate.

8. The structure of claim 7 wherein the polyisocyanate is blocked with a blocking agent selected from the group consisting of primary and secondary alcohols, monohydric and polyhydric phenols, amines, amides and lactams.

9. The structure of claim 8 wherein the blocked polyisocyanate is the product resulting from the reaction of the hydroxyl polyester resulting from the reaction of ethylene glycol, adipic acid, and 1,4-butandiol blocked with 4,4'-diphenylmethane diisocyanate.

10. The structure of claim 8 wherein the blocked polyisocyanate is the product resulting from the reaction of caprolactam and polymethylene polyphenylisocyanate.

11. The structure of claim 3 wherein the product resulting from the reaction of caprolactam and polymethylene polyphenylisocyanate is present.

12. A heat stable structure comprising a heat stable polyester tire cord bonded to rubber, the cord being made of polyethylene terephthalate fibers melt spun from a melt composition resulting from melting a physical mixture of polyethylene terephthalate having an I.V. of at least .6, from about .001 to .1 part by weight per 100 parts of polyethylene terephthalate of a metal complex, the metal ion of which has an incompletely satisfied $d$ orbital and whose ammonia and amine complexes have a log $k$ stability constant between about 5 and 25 and which complex contains at least one atom selected from the group consisting of O, N, P, S and halogen, from about .5 part to about 2.5 parts per 100 parts of polyethylene terephthalate of a polycarbonate derived from a 4,4'-dihydroxy di(mono nuclear aryl)alkane, and from about .01 part to about 1.5 parts per 100 parts of polyethylene terephthalate of an organic isocyanate.

13. The structure of claim 12 wherein the polycarbonate is the reaction product of carbonic acid and bis phenol A and has the repeating unit

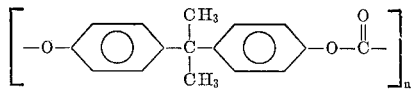

wherein $n$ has a value from about 10 to 400.

14. A method of improving the heat stable characteristics of a melt spun polyester fiber which comprises melt spinning a melt composition resulting from the melting of a physical mixture consisting essentially of polyethylene terephthalate having an I.V. of at least .6 and from about .001 to .1 part by weight per 100 parts of polyethylene terephthalate of a metal complex, the metal ion of which has an incompletely satisfied $d$ orbital and whose ammonia and amine complexes have a log $k$ stability constant between about 5 and 25 and which complex contains at least one atom selected from the group consisting of O, N, P, S and halogen.

15. The fiber of the method of claim 14.

16. A method of improving the heat stable characteristics of a melt spun polyester fiber which comprises melt spinning a melt composition resulting from the melting of a physical mixture of polyethylene terephthalate having an I.V. of at least .6, from about .001 to .1 part by weight per 100 parts of polyethylene terephthalate of a metal complex, the metal ion of which has an incompletely satisfied $d$ orbital and whose ammonia and amine complexes have a log $k$ stability constant between about 5 and 25 and which complex contains at least one atom selected from the group consisting of O, N, P, S, and halogen, and between about .5 part to about 2.5 parts per 100 parts of polyethylene terephthalate of a polycarbonate derived from a 4,4' dihydroxy di(mono nuclear aryl)alkane.

17. The fiber of the method of claim 16.

18. A method of improving the heat stable characteristics of a melt spun polyester fiber which comprises melt spinning a melt composition resulting from the melting of a physical mixture of polyethylene terephthalate having an I.V. of at least .6, from about .001 to .1 part by weight per 100 parts of polyethylene terephthalate of a metal complex, the metal ion of which has an incompletely satisfied $d$ orbital and whose ammonia and amine complexes have a log $k$ stability constant between about 5 and 25 and which complex contains at least one atom selected from the group consisting of O, N, P, S and halogen, and from about .01 part to about 1.5 parts per 100 parts of polyethylene terephthalate of an organic isocyanate.

19. The fiber of the method of claim 18.

20. A method of improving the heat stable characteristics of a melt spun polyester fiber which comprises melt spinning a melt composition resulting from the melting of a physical mixture of polyethylene terephthalate having an I.V. of at least .6, from about .001 to .1 part by weight per 100 parts by weight of polyethylene terephthalate of a metal complex, the metal ion of which has an incompletely satisfied $d$ orbital and whose ammonia and amine complexes have a log $k$ stability constant between about 5 and 25 and which complex contains at least one atom selected from the group consisting of O, N, P, S and halogen, from about .5 parts to about 2.5 parts per 100 parts of polyethylene terephthalate of a polycarbonate derived from a 4,4' dihydroxy di(mono nuclear aryl)alkane, and from about .01 part to about 1.5 parts per 100 parts of polyethylene terephthalate of an organic isocyanate.

21. The fiber of the method of claim 20.

References Cited

UNITED STATES PATENTS

| | | | |
|---|---|---|---|
| 3,051,212 | 8/1962 | Daniels | 260—75 |
| 2,630,419 | 3/1953 | Wakefield | 260—860 |
| 2,653,112 | 9/1953 | Roseveare | 152—359 |
| 2,680,108 | 6/1954 | Schmidt | 260—75 |
| 2,700,406 | 1/1955 | Georges | 152—359 |
| 2,798,859 | 7/1957 | Bruce | 260—858 |
| 3,058,948 | 10/1962 | Mosimann et al. | 260—75 |
| 3,214,489 | 10/1965 | Park | 260—858 |
| 3,264,255 | 8/1966 | Taylor | 260—75 |
| 3,313,862 | 4/1967 | Siggel et al. | 260—860 |
| 3,378,055 | 4/1968 | Robertson | 152—359 |
| 3,446,766 | 5/1969 | Taylor | 260—75 |
| 3,450,793 | 6/1969 | Schnell et al. | 260—858 |

FOREIGN PATENTS

| | | | |
|---|---|---|---|
| 132,546 | 5/1949 | Australia | 260—860 |
| 703,087 | 2/1965 | Canada | 260—860 |

HAROLD D. ANDERSON, Primary Examiner

E. WOODBERRY, Assistant Examiner

U.S. Cl. X.R.

152—330; 359; 161—172, 175, 231; 260—45.7, 45.75, 45.8, 75, 858, 860